United States Patent [19]

Kuritani et al.

[11] Patent Number: 4,712,209
[45] Date of Patent: Dec. 8, 1987

[54] MONITORING APPARATUS CAPABLE OF MONITORING A DIGITAL EQUIPMENT BY THE USE OF A SYNCHRONIZATION SIGNAL

[75] Inventors: Kazushige Kuritani; Tatsuhiko Nakagawa, both of Tokyo, Japan

[73] Assignee: NEC Corporation, Tokyo, Japan

[21] Appl. No.: 807,082

[22] Filed: Dec. 10, 1985

[30] Foreign Application Priority Data

Dec. 10, 1984 [JP] Japan ................... 59-260532

[51] Int. Cl.<sup>4</sup> ............... H04J 1/16; H04J 3/12
[52] U.S. Cl. ......................... 370/13; 370/15; 370/110.1
[58] Field of Search ............ 370/13, 100, 84, 17, 370/15, 110.1

[56] References Cited

U.S. PATENT DOCUMENTS 4,376,998  3/1983  Abbott et al. ................ 370/13
4,562,574  12/1985  Kambayashi ................. 370/13
4,601,028  7/1986  Huffman et al. ............. 370/15
4,606,019  8/1986  Takai ........................... 370/13

Primary Examiner—Douglas W. Olms
Assistant Examiner—Curtis Kuntz
Attorney, Agent, or Firm—Sughrue, Mion, Zinn, Macpeak & Seas

[57] ABSTRACT

In a monitoring apparatus for monitoring digital equipment including an on-line multiplexer for multiplexing a plurality of input signals into a single output signal, an on-line demultiplexer for demultiplexing a single input signal into a plurality of output signals, and off-line multiplexer and demultiplexer substitutable for the on-line multiplexer and demultiplexer, respectively, a pattern signal generator supplies the off-line multiplexer and demultiplexer with a monitoring signal of a predetermined pattern identical with a synchronization signal included in each of the plurality of input signals and the plurality of output signals. The monitoring signal is circulated through the off-line multiplexer and demultiplexer and is supplied to a monitoring circuit as a circulated signal. The monitoring circuit detects presence or absence of the predetermined pattern in the circulated signal to monitor occurrence of failure in the off-line multiplexer and demultiplexer. On monitoring the on-line multiplexer, a subsidiary multiplexed signal which is identical to the single output signal and sent from the on-line multiplexer through the off-line demultiplexer to the monitoring circuit as a first demultiplexed signal. The monitoring circuit monitors presence or absence of the predetermined pattern in the first demultiplexed signal. On monitoring the on-line demultiplexer, a second demultiplexed signal is selected from the plurality of output signals and sent to the monitoring circuit so as to detect presence or absence of the predetermined pattern in the second demultiplexed signal.

6 Claims, 2 Drawing Figures

MONITORING APPARATUS CAPABLE OF MONITORING A DIGITAL EQUIPMENT BY THE USE OF A SYNCHRONIZATION SIGNAL

BACKGROUND OF THE INVENTION

This invention relates to a monitoring apparatus for monitoring digital equipment in a digital transmission system, and more particularly to digital equipment which is a combination of a digital multiplexer and a digital demultiplexer. The digital equipment therefore multiplexes a plurality of input signals of a first transmission rate to a single or multiplexed output signal of a second transmission rate. The single output signal is transmitted to a counterpart digital equipment and demultiplexed into reproductions of the above-mentioned plurality of input signals. In contrast to the counterpart digital equipment, the first-mentioned digital equipment will be called a local digital equipment. A like single output signal is supplied from the counterpart digital equipment to the local digital equipment as a single or multiplexed input signal. The local digital equipment demultiplexes the single input signal into a plurality of output signals. Such digital equipment is described, for example, in an article contributed by Tomonori Okada et al to "NEC Research and Development," No. 78 (July 1985), pages 48 to 60, under the title of "MX3 Digital Multiplex Equipment," together with monitoring function for the equipment.

In the manner known in the art, each of the above-mentioned plurality of input signals is timed by a synchronization signal which will be referred to herein as an original synchronization signal and has a predetermined pattern indicative of the above-mentioned first transmission rate. It is therefore possible to understand that each input signal includes an original synchronization signal of a predetermined pattern. Similarly, the single input signal and each of the plurality of output signals include an input synchronization signal of an input pattern and an output synchronization signal of an output pattern, respectively.

Such a digital equipment usually comprises on-line and off-line multiplexers and on-line and off-line demultiplexers. The off-line multiplexer and the off-line demultiplexer may be substituted for the on-line multiplexer and the on-line demultiplexer, respectively, when failure or malfunction occurs in the on-line multiplexer and demultiplexer. Therefore, the digital equipment is protected from failure and malfunction and has a protection function. With the digital equipment, each of the on-line and the off-line multiplexers and the on-line and the off-line demultiplexers should be monitored so as to detect presence or absence of failure or malfunction in each of the multiplexers and demultiplexers. To this end, a monitoring apparatus is used in combination with the multiplexers and the demultiplexers.

As will later be described more in detail, a conventional monitoring apparatus supplies a monitoring signal to the digital equipment so as to monitor the off-line multiplexer and the off-line demultiplexer. The monitoring signal has a specific pattern irrespective of the plurality of input signals and the single input signal which are given to the on-line multiplexer and the on-line demultiplexer, respectively. The monitoring signal is successively circulated through the off-line multiplexer and the off-line demultiplexer and returned as a circulated signal back to the monitoring apparatus. The circulated signal is compared with the monitoring signal to detect occurrence of failure.

On the other hand, the on-line multiplexer is monitored by sending the plurality of input signals back to the monitoring apparatus on the one hand as first comparison signals, by allowing the plurality of input signals to pass through the off-line multiplexer and the off-line demultiplexer as second comparison signals, and by comparing the first and the second comparison signals in the monitoring apparatus.

Furthermore, the on-line demultiplexer is monitored by delivering, to the monitoring apparatus, the plurality of output signals resulting from the single input signal as third comparison signals, by delivering the single input signal to the off-line demultiplexer to allow the delivered single input signal to pass through the off-line demultiplexer as fourth comparison signals, and by comparing the third and the fourth comparison signals.

With this system, each of the multiplexers and the demultiplexers inevitably becomes complex in structure because a superfluous selector should be included in each of the multiplexers and the demultiplexers to send the first comparison signals back to the monitoring apparatus or to deliver the third and fourth comparison signals to the monitoring apparatus. In addition, the monitoring apparatus should comprise two comparators one of which compares the first and the second comparison signals and the other of which compares the third and the fourth comparison signals. Therefore, the monitoring apparatus also becomes complex in structure and becomes bulky in size. Such complex multiplexers and demultiplexers need complicated control of each of the multiplexers, the demultiplexers, and the monitoring apparatus on monitoring each of the multiplexers and the demultiplexers.

SUMMARY OF THE INVENTION

It is an object of this invention to provide a monitoring apparatus which is simple in structure and small in size.

It is another object of this invention to provide a monitoring apparatus of the type described which can control an on-line multiplexer and demultiplexer together with an off-line multiplexer and demultiplexer.

It is still another object of this invention to provide a digital transmission system wherein each of multiplexers and demultiplexers becomes simple in structure and small in size.

A monitoring apparatus to which this invention is applicable is for monitoring digital equipment which is for multiplexing a plurality of input signals into a single output signal and for demultiplexing a single input signal into a plurality of output signals. Each of the plurality of input signals includes an original synchronization signal of a predetermined pattern. The single input signal includes an input synchronization signal of an input pattern. Each of the plurality of output signals includes an output synchronization signal of an output pattern into which the input pattern is demultiplexed. The monitoring apparatus is for circulating a monitoring signal through the digital equipment and for receiving from the digital equipment a circulated signal which results from the monitoring signal. According to this invention, the monitoring apparatus comprises signal generating means for generating a pattern signal of the predetermined pattern, signal supplying means for supplying the pattern signal to the digital equipment as the monitoring signal, and monitoring means for monitoring the circulated signal to detect whether or not the circulated signal has the predetermined pattern.

DESCRIPTION OF THE PREFERRED EMBODIMENT

Figure 1:
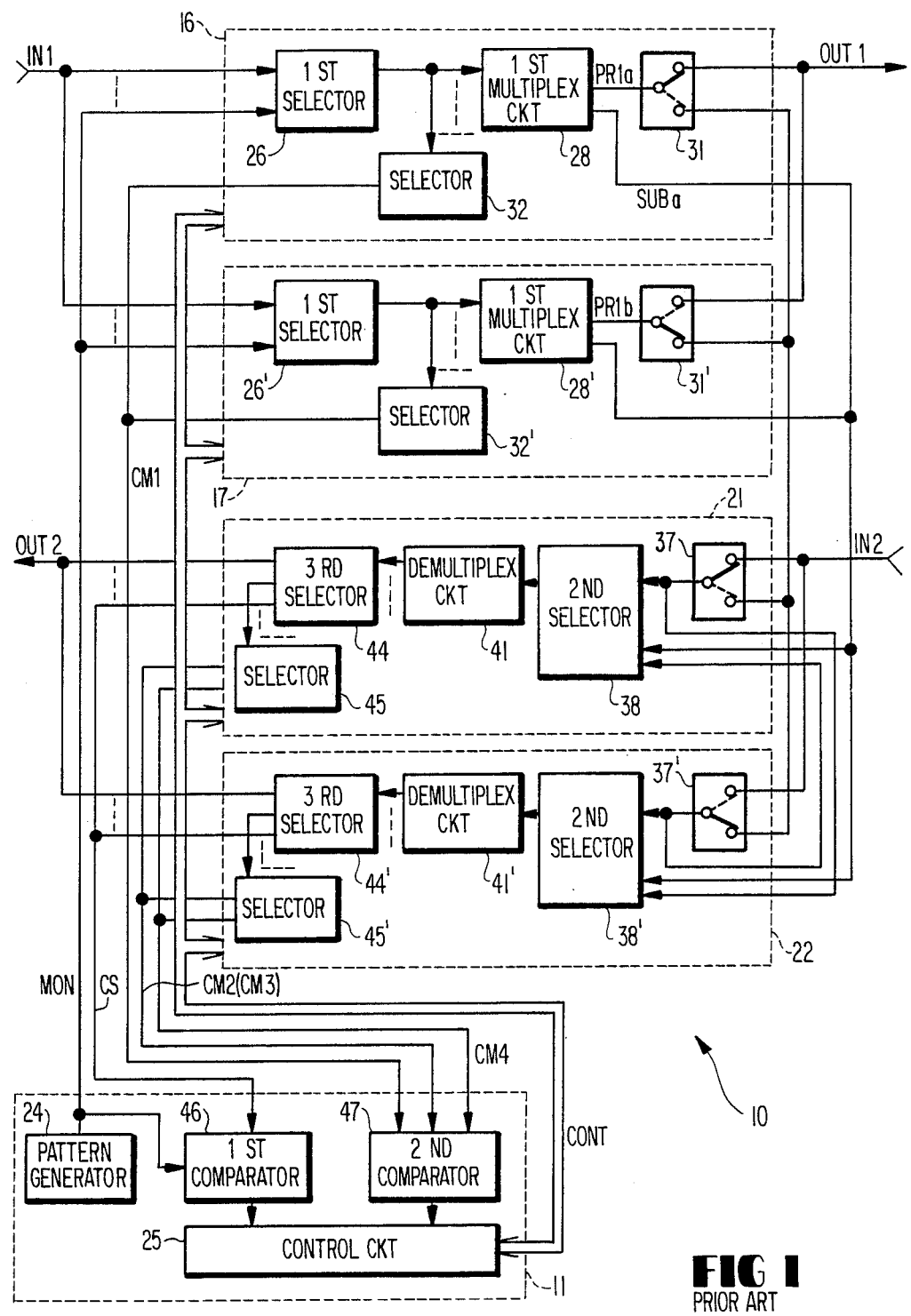
FIG. 1 is a block diagram of a conventional digital transmission system.

Referring to FIG. 1, a conventional digital transmission system will be described at first for a better understanding of this invention. The system comprises digital equipment 10 and a monitoring apparatus 11 for monitoring the digital equipment 10. The digital equipment 10 comprises first and second multiplexers 16 and 17 and first and second demultiplexers 21 and 22. The first and the second multiplexers 16 and 17 will be assumed to be on-line and off-line multiplexers, respectively, and comprise elements similar to each other. In this connection, primes (') are attached to the elements of the off-line multiplexer which correspond to the respective elements of the on-line multiplexer.

Likewise, the first and the second demultiplexers 21 and 22 will be assumed to be on-line and off-line demultiplexers, respectively. Elements of the off-line demultiplexer 21 are specified by primes.

A plurality of input signals, one of which is shown in FIG. 1 at IN1, are delivered to the on-line and the off-line multiplexers 16 and 17 in common. Each of the input signal IN1 has a first bit or symbol rate of, for example, 1.544 Mb/s and will be called a first input signal. The first input signals IN1 are multiplexed by the on-line multiplexer 16 in a manner to be described later into a single output signal OUT1 of a second or symbol rate which is higher than the first bit rate. The single output signal OUT1 is delivered to a counterpart device (not shown) and may be named a first output signal. The second bit rate may be, for example, 44.736 Mb/s. Each of the first input signals IN1 includes a sequence of first data signals and a synchronization signal which has a predetermined pattern as known in the art and which may be referred to as an original synchronization signal for convenience of description.

A single input signal IN2 is delivered from the counterpart device to the on-line and the off-line demultiplexers 21 and 22. The single input signal IN2 has the same bit rate as the second bit rate and will be called a second input signal. The second input signal IN2 is demultiplexed by the on-line demultiplexer 21 in a manner to be described later into a plurality of output signals, one of which is shown in FIG. 1 at OUT2 and which has the same rate as the first bit rate. The plurality of output signals OUT2 will be referred to as second output signals.

The second input signal IN2 includes a sequence of second data signals and a second synchronization signal which is demultiplexed into an output synchronization signal included in each of the second output signals OUT2. When the counterpart device and the on-line demultiplexer 21 are in due operation, the output synchronization signal is identical with the original synchronization signal.

The off-line multiplexer 17 and the off-line demultiplexer 22 will be described in detail later.

For the time being, it may be understood that the monitoring apparatus 11 comprises a pattern generator 24 for generating a monitoring signal MON of a specific pattern at the first bit rate and a control circuit 25 for delivering and receiving various control signals CONT to and from the multiplexers 16 and 17 and the demultiplexers 21 and 22. The monitoring signal MON is delivered to both the on-line and the off-line multiplexers 16 and 17 and is selected by the off-line multiplexer 17, as will presently be described. It is to be noted here that the specific pattern is selected without regard to the original and the output synchronization signals and is usually a pseudo random pattern.

Each of the on-line and the off-line multiplexers 16 and 17 comprises a first selector 26 (26') for selecting either the first input signals IN1 or the monitoring signal MON. Specifically, the on-line multiplexer 16 selects the first input signals IN1 while the off-line multiplexer 17 selects the monitoring signal MON. The first selector 26 (26') is coupled to a multiplex circuit 28 (28'). The multiplex circuit 28 (28') produces a primary multiplexed signal and a subsidiary multiplexed signal identical to the primary multiplexed signal.

In the on-line multiplexer 16, the primary multiplexed signal which is depicted at PRIa is sent through a first switch 31 to the counterpart device as the first output signal OUT1. The subsidiary multiplexed signal is sent to the on-line and the off-line demultiplexers 21 and 22 as an on-line subsidiary multiplexed signal SUBa. It is noted that the primary and the subsidiary multiplexed signals PRIa and SUBa in the on-line multiplexer 16 result from the first input signals IN1.

In the off-line multiplexer 17, the primary multiplexed signal alone is delivered through a first switch 31' to the on-line and the off-line demultiplexers 21 and. 22, with the subsidiary multiplexed signal stopped by the first multiplex circuit 28'. The primary multiplexed signal in the off-line multiplexer 17 results from the monitoring signal MON and may be referred to as an off-line primary multiplexed signal PRIb.

A first additional selector 32 (32') is indispensable to each of the on-line and the off-line multiplexers 16 and 17 so as to monitor the on-line and the off-line multiplexers 16 and 17, as will become clear later.

Each of the on-line and the off-line demultiplexers 21 and 22 is supplied from the counterpart device with the second input signal IN2. The on-line subsidiary multiplexed signal SUBa is given from the on-line multiplexer 16 directly to the on-line and the off-line demultiplexers 21 and 22. In addition, the off-line primary multiplexed signal PRIb is also given from the off-line multiplexer 17 to the on-line and the off-line demultiplexers 21 and 22.

Each of the on-line and the off-line demultiplexers 21 and 22 comprises a second switch 37 (37'), a second selector 38 (38'), a demultiplex circuit 41 (41'), and a third selector 44 (44'). In addition, a second additional selector 45 (45') should be included in each of the on-line and the off-line demultiplexers 21 and 22 in consideration of monitoring the on-line and the off-line demultiplexers 21 and 22, as will presently be described.

Let the off-line multiplexer 17 and the off-line demultiplexer 22 be monitored by the monitoring apparatus 11.

As shown in FIG. 1, the first switch 31 delivers the on-line primary multiplexed signal PRIa to the counterpart device while the first switch 31'delivers the off-line primary multiplexed signal PRIb to the on-line and the off-line demultiplexers 21 and 22. The second switch 37 in the on-line demultiplexer 21 selects the second input signal IN2 while the second switch 37' in the off-line demultiplexer 22 selects the off-line primary multiplexed signal PRIb. In this event, the second input signal IN2 is fed through the second switch 37 of the on-line demultiplexer 21 to the second selector 38' of the off-line demultiplexer 22. Likewise, the off-line primary multiplexed signal PRIb is fed through the second switch 37' of the off-line demultiplexer 22 to the second selector 38 of the on-line demultiplexer 21.

Under the circumstances, the monitoring signal MON is selected by the first selector 26' of the off-line multiplexer 17. Accordingly, the monitoring signal MON is fed through the multiplex circuit 28', the first switch 31', and the second switch 37' to the second selector 38' of the off-line demultiplexer 22 as the off-line primary multiplexed signal PRIb. On the other hand, the monitoring signal MON is not selected by the first selector 26 of the on-line multiplexer 16.

The second selector 38' of the off-line demultiplexer 22 is supplied with the second input signal IN2 and the on-line subsidiary multiplexed signal SUBa in addition to the off-line primary multiplexed signal PRIb.

The off-line primary multiplexed signal PRIb is selected by the second selector 38' of the off-line demultiplexer 22 under control of the monitoring apparatus 11 to be sent to the demultiplex circuit 41'. The demultiplex circuit 41' delivers a reproduction of the monitoring signal MON through the third selector 44' to the monitoring apparatus 11 as a circulated signal CS. From this fact, it is readily understood that the third selector 44 (44') serves to selectively produce the second output signals OUT2 and the circulated signal CS in accordance with the control signals CONT given from the control circuit 25. In this case, the third selector 44 of the on-line demultiplexer 21 produces the second output signals OUT2. In addition, the second additional selectors 45 and 45' of the on-line and the off-line demultiplexers 21 and 22 are kept inactive while the off-line multiplexer 17 and the off-line demultiplexer 22 are monitored by the use of the monitoring signal MON.

The monitoring apparatus 11 comprises a first comparator 46 for comparing the monitoring signal MON with the circulated signal CS to detect whether or not the circulated signal CS is coincident with the monitoring signal MON. Such comparison is carried out in a bit-by-bit fashion. Inasmuch as the circulated signal CS results from the monitoring signal MON, coincidence has to be detected between the monitoring and the circulated signals MON and CS if no failure occurs in each of the off-line multiplexer 17 and the off-line demultiplexer 22.

If incoincidence is detected between the monitoring and the circulated signals MON and CS, the control circuit 25 judges that a failure or malfunction has occurred in the off-line multiplexer 17 and/or the off-line demultiplexer 22. On detecting the incoincidence between the monitoring and the circulated signals MON and CS, the on-line multiplexer 16 and the on-line demultiplexer 21 are not switched to the off-line multiplexer 17 and the off-line demultiplexer 22 even when failure or malfunction occurs in the on-line multiplexer 16 and the on-line demultiplexer 21.

If the off-line multiplexer 17 and the off-line demultiplexer 22 are confirmed to be normal as a result of detection of the coincidence between the monitoring and the circulated signals MON and CS, the on-line multiplexer 16 and the on-line demultiplexer 22 are individually monitored by the monitoring apparatus 11. On monitoring the on-line multiplexer 16, the first input signals IN1 are selected by the first selector 26 to be successively delivered to the monitoring apparatus 11 as first comparison signals CM1 through the first additional selector 32 on the one hand. Thus, the first additional selector 32 successively selects selector outputs of the first selector 26 to produce the first comparison signals CM1.

On the other hand, the first input signals IN1 are also delivered through the multiplex circuit 28 as the on-line subsidiary multiplexed signal SUBa to the second selector 38' of the off-line demultiplexer 22. The on-line subsidiary multiplexed signal SUBa is selected by the second selector 38' to be sent through the demultiplex circuit 41', the third selector 44', and the second additional selector 45' to the monitoring apparatus 11 as second comparison signals CM2.

A second comparator 47 compares the first comparison signals CM1 with the second comparison signals CM2 to detect coincidence or incoincidence between the first and the second comparison signals CM1 and CM2 and to produce a coincidence or an incoincidence signal representative of the coincidence or the incoincidence. Responsive to the incoincidence signal, the control circuit 11 delivers the control signals CONT to switch from the on-line multiplexer 16 to the off-line multiplexer 17. As a result, the first switches 31 and 31' are switched as shown by broken lines in FIG. 1. Such switching is carried out under control of a fault monitoring circuit (not shown) included in each of the on-line and the off-line multiplexers 16 and 17.

On monitoring the on-line demultiplexer 22, the second input signal IN2 passes through the on-line demultiplexer 21 by way of the second switch 37, the second selector 38, the demultiplex circuit 41, and the third and the second additional selectors 44 and 45 as third comparison signals CM3. Likewise, the second input signal IN2 also passes through the off-line demultiplexer 22 by way of the second switch 37 of the on-line demultiplexer 21, the second selector 38' of the off-line demultiplexer 22, the demultiplex circuit 41', and the third and the second additional selectors 44' and 45' as fourth comparison signals CM4. The second comparator 47 compares the third comparison signals CM3 with the fourth comparison signals CM4 to detect coincidence or incoincidence therebetween in the above-mentioned manner.

Thus, additional selectors, such as 32, 32', 45 and 45', should be installed in the multiplexers and the demultiplexers so as to carry out a monitoring operation in the above-mentioned manner. Two comparators, such as 46 and 47, should be included in the monitoring apparatus 11. Moreover, a complicated control operation must be carried out in each of the demultiplexers 21 and 22. Therefore, the illustrated system is disadvantageous as described in the preamble of this specification.

Figure 2:
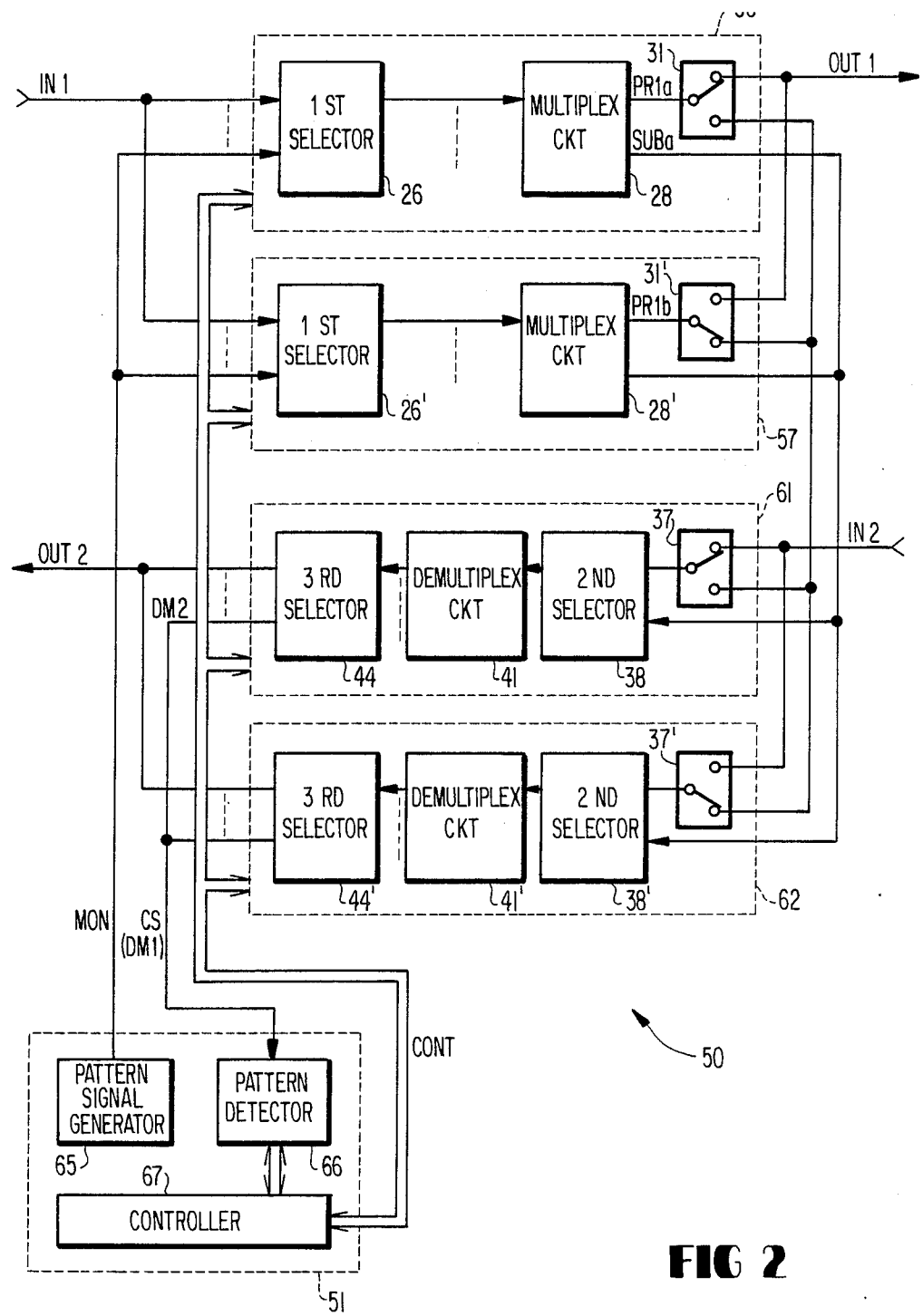
FIG. 2 is a block diagram of a digital transmission system comprising a monitoring apparatus according to a preferred embodiment of this invention.

Referring to FIG. 2, a digital transmission system comprises digital equipment 50 and a monitoring apparatus 51 according to a preferred embodiment of this invention. The digital equipment 50 comprises first and second multiplexers 56 and 57 and first and second demultiplexers 61 and 62. Like in FIG. 1, it is assumed that the first and second multiplexers 56 and 57 are operable as on-line and off-line multiplexers, respectively, and that the first and second demultiplexers 61 and 62 are operable as on-line and off-line demultiplexers, respectively. Elements and signals similar to those illustrated in FIG. 1 are depicted at the same reference numerals and symbols. It is to be noted here that the additional selectors, such as 32, 32', 45, and 45', are omitted from the illustrated multiplexers 56 and 57 and demultiplexers 61 and 62 and are therefore simple in structure in comparison with those illustrated in FIG. 1. In addition, the second input signal IN2 and the off-line primary multiplexed signal PRIb are not delivered to the second selector 38' of the off-line demultiplexer 22 and to the second selector 38 of the on-line demultiplexer 21, respectively. Therefore, internal connections therefor are omitted between the on-line and the off-line demultiplexers 61 and 62. Like in FIG. 1, each first input signal IN1 includes an original synchronization signal of a predetermined pattern. The second input signal IN2 includes an input synchronization signal of an input pattern. Each second output signal OUT2 includes an output synchronization signal of an output pattern. Furthermore, the on-line subsidiary multiplexed signal PRIa is delivered to the on-line and the off-line demultiplexers 61 and 62 and the off-line primary multiplexed signal PRIb is also delivered to the on-line and the off-line demultiplexers 61 and 62.

The illustrated monitoring apparatus 51 comprises a pattern signal generator 65 for generating a specific pattern signal of the predetermined pattern as the monitoring signal MON. When no failure is present in the counterpart multiplexer mentioned in conjunction with FIG. 1 and in the demultiplexer 61, the output pattern is identical with the predetermined pattern of the specific pattern signal. In addition, a pattern detector 66 and a controller 67 are included in the monitoring apparatus 51 and operable in a manner to be described hereinunder. The controller 67 may be a microprocessor.

In the illustrated system, a monitoring operation is divided into a first mode of operation for monitoring the off-line multiplexer 57 and the off-line demultiplexer 62, a second mode for monitoring the on-line multiplexer 56, and a third mode for monitoring the on-line demultiplexer 61. The first through third modes are successively carried out, as will become clear as the description proceeds. Each mode lasts for a predetermined time interval of, for example, 200 milliseconds.

In the first mode, the controller 67 supplies the multiplexers 56 and 57 and the demultiplexers 61 and 62 with a mode signal representative of the first mode as the control signals CONT. In this event, the on-line multiplexer 56 selects the first input signals IN1 by the use of the first selector 26 therein while the off-line multiplexer 57 selects the specific pattern signal by the first selector 26'. As a result, the specific pattern signal is sent through the off-line multiplexer 57 as the off-line primary multiplexed signal PRIb to the off-line demultiplexer 62 in the manner mentioned in conjunction with FIG. 1. The off-line demultiplexer 62 allows the off-line primary multiplexed signal PRIb to pass through the second selector 38', the demultiplex circuit 41', and the third selector 44'. As a result, the off-line primary multiplexed signal PRIb which results from the specific pattern signal is delivered as a circulated signal CS to the pattern detector 66 of the monitoring apparatus 51. Thus, a connection between the pattern signal generator 65 and the off-line multiplexer 57' serves to supply the monitoring signal MON to the off-line multiplexer 57'. Likewise, a connection between the off-line demultiplexer 62 and the pattern detector 66 serves to supply the circulated signal to the pattern detector 66. Therefore, the connections may be referred to as a signal supplying circuit for the monitoring signal. With these connections in this first mode of operation, a single signal path is formed from the pattern signal generator 65, through the off-line multiplexer 57 and the off-line demultiplexer 62, to the pattern detector 66. The specific pattern signal follows the single path.

The pattern detector 66 detects presence and absence of the predetermined pattern in the circulated signal CS to supply the controller 67 with a presence and an absence signal representative of the presence and absence of the predetermined pattern, respectively.

Responsive to the presence signal, the controller 67 judges that no failure occurs in the off-line multiplexer 57 and the off-line demultiplexer 62. Consequently, the controller 57 makes the monitoring operation proceed to the second mode for the on-line multiplexer 56. Otherwise, the controller 67 delivers an alarm signal to an external device (not shown) and repeats the first mode.

In the second mode, the controller 67 produces the control signals CONT to make the multiplex circuit 28 of the on-line multiplexer 56 deliver the on-line subsidiary multiplexed signal SUBa to the second selector 38' of the off-line demultiplexer 62 and to make each of the second and the third selectors 38' and 44' select the on-line subsidiary multiplexed signal SUBa.

Under the circumstances, the on-line multiplexer 56 allows the first input signals IN1 to pass therethrough as the on-line subsidiary multiplexed signal SUBa with the on-line primary multiplexed signal PRIa delivered to the first switch 31. As a result, the off-line demultiplexer 62 supplies the pattern detector 66 with a first demultiplexed signal DM1 resulting from the first input signals IN1.

Inasmuch as each of the first input signals IN1 comprises the original synchronization signal, the first demultiplexed signal DM1 has to include the predetermined patterns of the first input signals IN1 when no failure takes place in the on-line multiplexer 56. In other words, no detection of the predetermined pattern may be recognized as occurrence of any failure in the on-line multiplexer 56.

The pattern detector 66 searches for the predetermined pattern of the first demultiplexed signal DM1 in the manner described in conjunction with the first mode. On detection of presence of the predetermined pattern, the controller 67 makes the monitoring operation proceed to the third mode for the on-line demultiplexer 61. Otherwise, the controller 67 delivers another set of the control signals CONT to the on-line and the off-line multiplexers 56 and 57 to switch the multiplexers 56 and 57 from one to the other. As a result, the second multiplexer 57 becomes the on-line multiplexer while the first multiplexer 56 becomes the off-line multiplexer. After the multiplexers are switched from one to the other, the monitoring operation is followed by the third mode.

In the third mode, the controller 67 produces a further set of the control signals CONT to make the on-line demultiplexer 61 deliver a second demultiplexed signal DM2 as one of the second output signals OUT2 to the pattern detector 66. Such control of the third selector 44 is readily possible in a known manner. The second demultiplexed signal DM2 results from the second input signal IN2 and therefore has to include the predetermined pattern of the output synchronization signal when no failure occurs in the on-line demultiplexer 61. Therefore, the pattern detector 66 can detect whether the on-line demultiplexer 61 is normal or stalled, by monitoring the second demodulated signal DM2 in the manner mentioned in conjunction with the second mode.

Thus, a combination of the pattern detector 66 and the controller 67 serves to monitor each of the multiplexers and the demultiplexers and will be called a monitoring circuit.

Thus, the illustrated monitoring apparatus 51 monitors the on-line and the off-line multiplexers and the on-line and the off-line demultiplexers by the use of the synchronization signal included in the first input signals IN1 and the second output signals OUT2. This means that the same pattern can be used to monitor both of on-line and off-line devices in common. Therefore, the monitoring apparatus is simple in structure. In addition, the illustrated multiplexers and demultiplexers dispense with additional selectors, such as 32, 32', 35, and 35' and are therefore simple in structure. This simplifies control of the controller 67. Accordingly, the system can accomplish a high reliability with economy.

While this invention has thus far been described in conjunction with a preferred embodiment thereof, it will readily be possible for those skilled in the art to put this invention into practice in various other manners. For example, the off-line multiplexer or demultiplexer may not be single but rather may be plural in number.

What is claimed is:

1. In a monitoring apparatus for monitoring digital equipment for multiplexing a plurality of input signals into a single output signal and for demultiplexing a single input signal into signal into a plurality of output signals, each of said plurality of input signals including an original synchronization signal of a predetermined pattern, said single input signal including an input synchronization signal of an input pattern, each of said plurality of output signals including an output synchronization signal of an output pattern into which said input pattern is demultiplexed, said monitoring apparatus circulating a monitoring signal through said digital equipment and receiving from said digital equipment a circulated signal which results from said monitoring signal, the improvement wherein said monitoring apparatus comprises:

signal generating means for generating as said monitoring signal a pattern signal identical with said predetermined pattern;

signal supplying means for supplying said monitoring signal to said digital equipment, wherein said digital equipment produces said circulated signal by forming a single path for said monitoring signal; and monitoring means, connected to said signal supplying means, for monitoring said circulated signal to detect whether or not said circulated signal has said predetermined pattern.

2. A monitoring apparatus as claimed in claim 1, wherein said signal supplying means comprises:

means for supplying said monitoring signal to said digital equipment in addition to said plurality of input signals, wherein said digital equipment produces a result signal in accordance with said monitoring signal; and means, connected to said digital equipment, for supplying said result signal to said monitoring means as said circulated signal.

3. A monitoring apparatus as claimed in claim 1, wherein said monitoring means comprises detecting means, responsive to said circulated signal, for detecting whether or not said circulated signal contains said predetermined pattern.

4. A method of monitoring digital equipment which comprises an on-line multiplexer for multiplexing a plurality of input signals into a single output signal, an on-line demultiplexer for demultiplexing a single input signal into a plurality of output signals, an off-line multiplexer substitutable for said on-line multiplexer, and an off-line demultiplexer substitutable for said on-line demultiplexer, each of said plurality of input signals including an original synchronization signal of a predetermined pattern, said single input signal including an input synchronization signal of an input pattern, each of said plurality of output signals including an output synchronization signal of an output pattern into which said input pattern is demultiplexed, said output pattern being identical with said predetermined pattern, said method comprising the steps of:

circulating a monitoring signal of a specific signal pattern identical with said predetermined pattern through said off-line multiplexer and said off-line demultiplexer;

deriving a circulated signal from said off-line multiplexer in accordance with said circulating step by forming a single path for said monitoring signal; and detecting presence or absence of said specific signal pattern in said circulate signal to monitor said off-line multiplexer and said off-line demultiplexer.

5. A method as claimed in claim 4, further comprising the steps of:

deriving a subsidiary single output signal identical with said single input signal from said on-line multiplexer and delivering said subsidiary single output signal to said off-line demultiplexer;

demultiplexing said subsidiary single output signal into a first demultiplexed signal; and detecting presence or absence of said predetermined pattern in said first demultiplexed signal to monitor said on-line multiplexer.

6. A method as claimed in claim 4, further comprising the steps of:

deriving one of said output signals as a second demultiplexed signal from said on-line demultiplexer; and monitoring said on-line demultiplexer by detecting presence or absence of said output pattern in said second demultiplexed signal.

* * * * *

UNITED STATES PATENT AND TRADEMARK OFFICE
CERTIFICATE OF CORRECTION

PATENT NO. : 4,712,209

DATED : December 8, 1987

INVENTOR(S) : Kuritani et al

It is certified that error appears in the above-identified patent and that said Letters Patent is hereby corrected as shown below:

COLUMN 7, LINE 64    Delete "57'" and insert --57--;

COLUMN 7, LINE 66    Delete "57'" and insert --57--;

COLUMN 9, LINE 32    Delete "into signal"

Signed and Sealed this

First Day of November, 1988

Attest:

DONALD J. QUIGG

Attesting Officer

Commissioner of Patents and Trademarks